United States Patent [19]

Radziuk

[11] Patent Number: 5,777,733
[45] Date of Patent: Jul. 7, 1998

[54] SPECTROMETER WITH WAVELENGTH CALIBRATION

[75] Inventor: Bernhard Radziuk, Frickingen, Germany

[73] Assignee: Bodenseewerk Perkin-Elmer GmbH, Überlingen, Germany

[21] Appl. No.: 753,869

[22] Filed: Dec. 3, 1996

[30] Foreign Application Priority Data

Dec. 4, 1995 [DE] Germany ............... 195 45 178.3

[51] Int. Cl.$^6$ ............................................. G01J 3/18
[52] U.S. Cl. ............................................ 356/328; 356/333
[58] Field of Search ............................... 356/328, 333, 356/334

[56] References Cited

U.S. PATENT DOCUMENTS

| | | | |
|---|---|---|---|
| 4,191,473 | 3/1980 | Hansch | 356/300 |
| 4,531,836 | 7/1985 | Smith, Jr. et al. | 356/316 |
| 4,636,074 | 1/1987 | Levy et al. | 356/328 |
| 4,692,883 | 9/1987 | Nelson et al. | 364/571 |
| 4,893,259 | 1/1990 | Grosser et al. | 364/525 |

FOREIGN PATENT DOCUMENTS

| | | |
|---|---|---|
| 0463600 | 1/1992 | European Pat. Off. |
| 2415049 | 7/1981 | Germany . |
| 3539667 | 5/1987 | Germany . |
| 3631032 | 3/1988 | Germany . |
| 4201024 | 7/1992 | Germany . |
| 3811922 | 9/1994 | Germany . |
| 3811923 | 2/1995 | Germany . |
| WO9221948A | 12/1992 | WIPO . |

OTHER PUBLICATIONS

Tseng C-H et al "Wave Length Calibration of a Multi-Channel Spectrometer" in applied spectrosocpy, vol. 47, No. 11, Nov. 11, 1993.

*Primary Examiner*—Vincent P. McGraw
*Attorney, Agent, or Firm*—David Aker

[57] ABSTRACT

The present invention refers to a spectrometer device comprising a monochromator means, a light-measuring means receiving light from said monochromator means, and a calibration means comprising a calibration light source. The present invention provides a new spectrometer device whose light-measuring means comprises a plurality of light-measuring elements in an array extending in the direction of dispersion of the monochromator means, and whose calibration means carries out, on the basis of a spectral light measurement with the aid of the calibration light source, an association between the light-measuring elements and the wavelengths of the spectral light which is adapted to be detected by the respective light-measuring elements. These measures substantially facilitate the calibration and especially the automatic execution of said calibration, if desired simultaneously with a spectra measurement, and they improve the accuracy of the calibration.

23 Claims, 2 Drawing Sheets

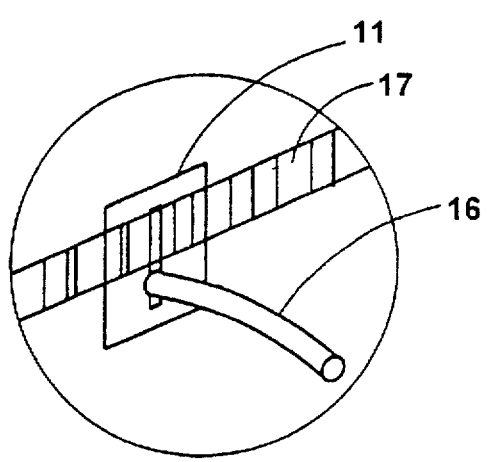
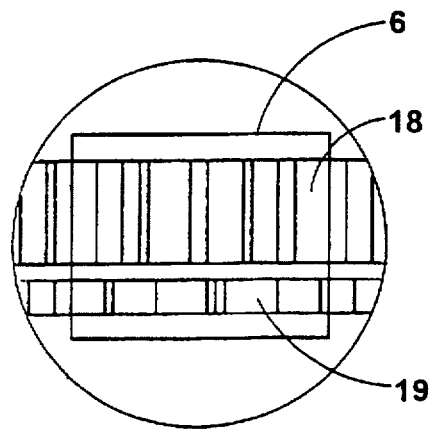
Fig. 3                    Fig. 4
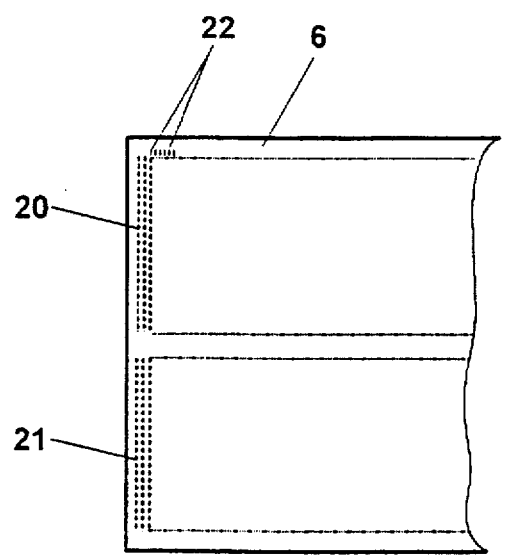
Fig. 5

SPECTROMETER WITH WAVELENGTH CALIBRATION

TECHNICAL FIELD

The present invention refers to a spectrometer device comprising a monochromator means, a light-measuring means receiving spectral light from said monochromator means, and a calibration means comprising a calibration light source.

BACKGROUND ART

Spectrometer devices of this type are known whose monochromator means is adapted to be adjusted, by adjusting the position of at least one dispersing element included therein, in such a way that it permits different wavelengths or wavelength regions to pass. By determining light measurement values for various adjustment values with the aid of a light-measuring means, which is normally formed by a photo-multiplier, it is possible to determine, in dependence upon the wavelength of the emitted light, light intensity values for a sample light source to be examined and, consequently, spectra of said sample light source.

With the aid of a calibration light source having a known spectrum, it can be examined whether a wavelength value set at the monochromator means corresponds to the actually existing value of the wavelength which has been allowed to pass. For this purpose, the light intensity is determined on the basis of the set value in dependence upon an adjustment of the monochromator means, and the setting scale of the monochromator means is adjusted in accordance with a maximum value determined.

SUMMARY OF THE INVENTION

It is the object of the present invention to provide a new spectrometer device of the type mentioned at the beginning whose calibration is improved in comparison with the prior art described.

The spectrometer device according to the present invention by means of which this object is achieved is characterized in that the light-measuring means comprises a plurality of light-measuring elements in an array extending in the direction of dispersion of the light received, and that the calibration means is provided for carrying out, on the basis of a spectral light measurement by the calibration light source, an association between the light-measuring elements and the wavelengths of the light which is adapted to be detected by the respective light-measuring elements.

This solution according to the present invention results in a substantial simplification of the calibration of the spectrometer device in view of the fact that no mechanical displacement of the monochromator means is required for the purpose of calibration and in view of the fact that the correction of displacements of the monochromator means, which have been caused especially due to the influence of heat, can be carried out by electronic means alone, through a calibration circuit which is connected to the light-measuring elements and which can be implemented especially by a program-controlled data processing unit. In addition, the calibration can be performed with higher accuracy and simultaneously with the spectral examination of a sample.

In accordance with a preferred embodiment of the present invention, the light-measuring means comprises a matrix array of light-measuring elements including light-measuring element lines which extend in the direction of dispersion of the light received and light-measuring element columns which extend along light reception lines of constant wavelength, i.e. at right angles to the direction of dispersion, the calibration means associating a wavelength value with the light-measuring elements of the respective colunms. It will be advantageous when in such an array of light-measuring elements a wavelength value associated with one light-measuring element is valid for all light-measuring elements of the respective column. When a large number of light-measuring elements is used in the respective columns, various spatial regions of a sample light source, which are arranged along a monochromator entry gap, can be examined, and it is, for example, possible to evaluate, for the purpose of spectral examination, within the framework of a spectrometric examination of the sample light source only the measurement value of such a light-measuring element of a matrix column for which a particularly high signal-to-noise ratio is obtained.

In accordance with a further advantageous embodiment of the present invention, light of the calibration light source can be provided for feeding into an entry gap of the monochromator means during the examination of the sample light source in such a way that light from the sample light source and light from said calibration light source fall separately onto light-measuring elements of different light-measuring element lines. In this way, the calibration and a spectral measurement can be carried out in a temporally overlapping mode by providing e.g. a data processing unit, which constitutes the calibration means, with a processing program in such a way that, during the association of wavelengths with light-measuring elements, light measurement values produced by a sample light source to be examined are already detected.

In accordance with a particularly preferred embodiment of the present invention, the monochromator means is a double monochromator comprising a first monochromator which carries out a wavelength preselection and a second monochromator which splits the preselected light still further, the first monochromator being preferably a prism monochromator and the second one an echelle monochromator. Especially due to the use of a combination of prism and echelle monochromators, a high dispersion and, consequently, a high resolution of the monochromator means can be achieved in combination with a high throughput of light, and the monochromators can be provided in a monochromator means, which is adapted to be adjusted to different wavelength regions, especially in such a way that, on the basis of a suitable length of the light-measuring means in the direction of dispersion, only light according to approximately one single order of diffraction coming from the second monochromator falls on said light-measuring means for each adjustment value of the monochromator means.

Another specially preferred embodiment of the present invention provides the feature of feeding calibration light of the calibration light source into an intermediate gap inserted between said first and said second monochromator. In view of the fact that, due to this feeding in the intermediate gap, no wavelength preselection is effected with regard to the light of the calibration light source, the selection of a calibration light source having a suitable spectrum offers the possibility of imaging on the light-measuring means an illumination pattern, which is generated by the calibration light source, for each adjustment value of the monochromator means so that, on the basis of such a defined illumination pattern, a calibration can be carried out at each adjustment position of the monochromator means. The generation of such an illumination pattern for each adjustment value of the monochromator means is possible due to the fact that, in view of the non-existing wavelength preselection in connection with the feeding of calibration light into the intermediate gap, diffraction light of various orders of diffraction can be used for forming an image on the light-measuring means.

The light-measuring means is preferably formed by a CCD field with a matrix array of pixels. In accordance with a preferred embodiment, two separate pixel fields with elongate pixels are provided, the longitudinal sides of said pixels extending at right angles to the direction in which the light emitted by the monochromator means is dispersed.

In the divided matrix array, one field receives light of a sample light source to be examined, whereas the light impinging on the other field is light coming from the calibration light source. Elongate pixels can, for example, be used as pixels having dimensions of 50 μm×12 μm.

In accordance with a preferred embodiment, the length along which the light-measuring element matrix lines extend in the direction of dispersion is approximately 3 mm, an amount of 200 to 300 light-measuring element columns being arranged along this length. The dimensions of the light-measuring means are primarily limited by the shape and the dimensions of the focal surface of an image-forming optics focussing the monochromator output beam onto the light-measuring means.

As has already been mentioned, it will be expedient to use a calibration means consisting of a program-controlled data processing unit which processes light-measurement values of the light-measuring means for associating wavelengths and light-measuring elements; this data processing unit can be provided with a pattern recognition program for recognizing spectral image patterns of the calibration light source for each adjustment position of the monochromator means. The recognition program can especially be provided for evaluating the relative positions of lines of the calibration spectrum for recognizing spectral lines corresponding to specific wavelengths. A recognition program can, in the final analysis, be based on the measure of storing for each adjustment value of the monochromator means a spectral image pattern of the calibration light source obtained for this adjustment value and a relative position of a spectral line with regard to the spectral image pattern, said spectral line corresponding to the wavelength adjustment value.

It will be advantageous when individual correction factors for measured intensity values or individual calibration factors are stored in the data processing unit for at least part of the light-measuring elements. This offers the possibility of compensating for production-dependent sensitivity variations of the pixels, whereby the measurement accuracy of the spectral measurement will be increased still further.

In addition, the data processing unit can be provided with a processing program which controls, during the association of wavelengths with light-measuring elements, the detection of light measurement values produced by a sample light source to be examined, whereby time will be saved. In particular, this processing program is able to determine, on the basis of a preliminary determination of light measurement values of the sample light source, the measurement time for the actual spectral measurement of the sample light source, whereby the dynamic measurement range of the pixels is extended in an advantageous manner due to the fact that the measurement time is reduced as the light intensity increases so that an operation of the pixels in the saturation range is avoided.

Other possible advantageous embodiments of the present invention are disclosed in the subclaims.

BRIEF DESCRIPTION OF THE DRAWINGS

The present invention will now be explained and described in detail on the basis of an embodiment and the drawings enclosed, which refer to this embodiment and in which FIG. 3 shows a monochromator intermediate gap through which light from a calibration light source enters, said intermediate gap being used in connection with the monochromator according to FIG. 1 and 2, FIG. 4 shows a light-measuring means used in the spectrometer device according to FIG. 1 and FIG. 2, and the spatial relation between said spectrometer device and the spectral lines of a sample light source and of a calibration light source which are adapted to be imaged on said light-measuring means, FIG. 5 shows a detailed representation of the light-measuring means according to FIG. 4.

DETAILED DESCRIPTION OF THE PREFERRED EMBODIMENT

Figure 1:
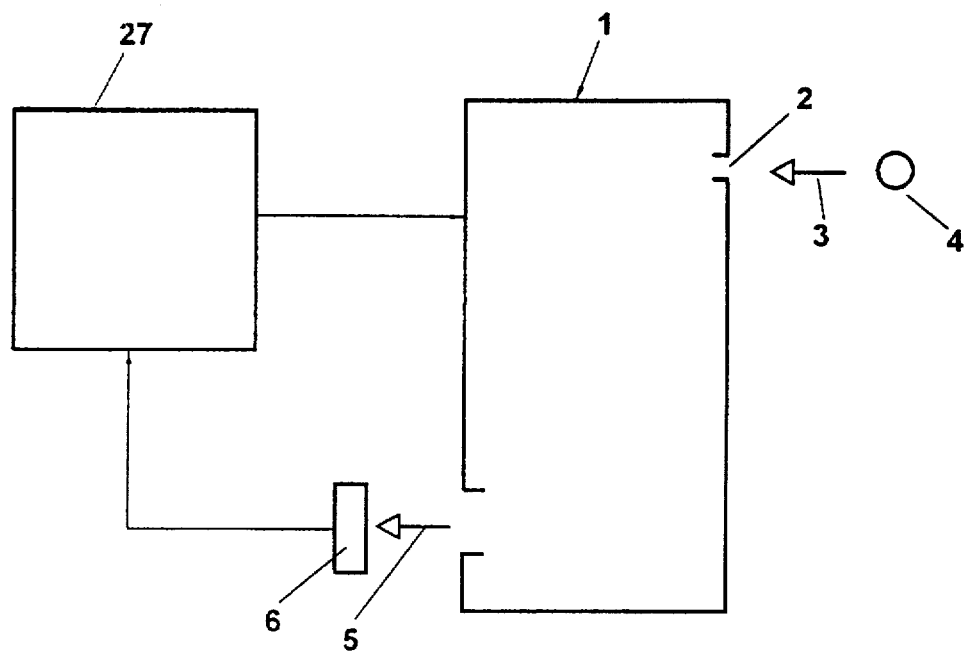
FIG. 1 shows a schematic representation of a spectrometer device according to the present invention.

In FIG. 1, reference numeral 1 designates a monochromator means with a light entry gap 2 through which light enters according to arrow 3, said light being emitted from a sample light source 4 to be examined.

Reference numeral 6 designates in FIG. 1 a light-measuring means, which will be described in detail on the basis of FIG. 4 and 5 hereinbelow and which receives emergent light from the monochromator means 1 according to arrow 5. In accordance with the function of the monochromator means, the emergent light only contains light wavelengths of a closely limited wavelength region of the light of the sample light source 4.

The light-measuring means 6 is connected to a control and evaluation unit 27, which is, in turn, connected to the monochromator means 1 so as to adjust said monochromator means to a specific wavelength which is allowed to pass. A further essential function of the control and evaluation unit 27, which consists of a computer in the case of the present embodiment, is the processing of light measurement values which are supplied to said control and evaluation unit 27 by the light-measuring means 6. For determining spectra, the unit 27 associates with measured light intensities the wavelength of the light whose intensity has been measured.

Figure 2:
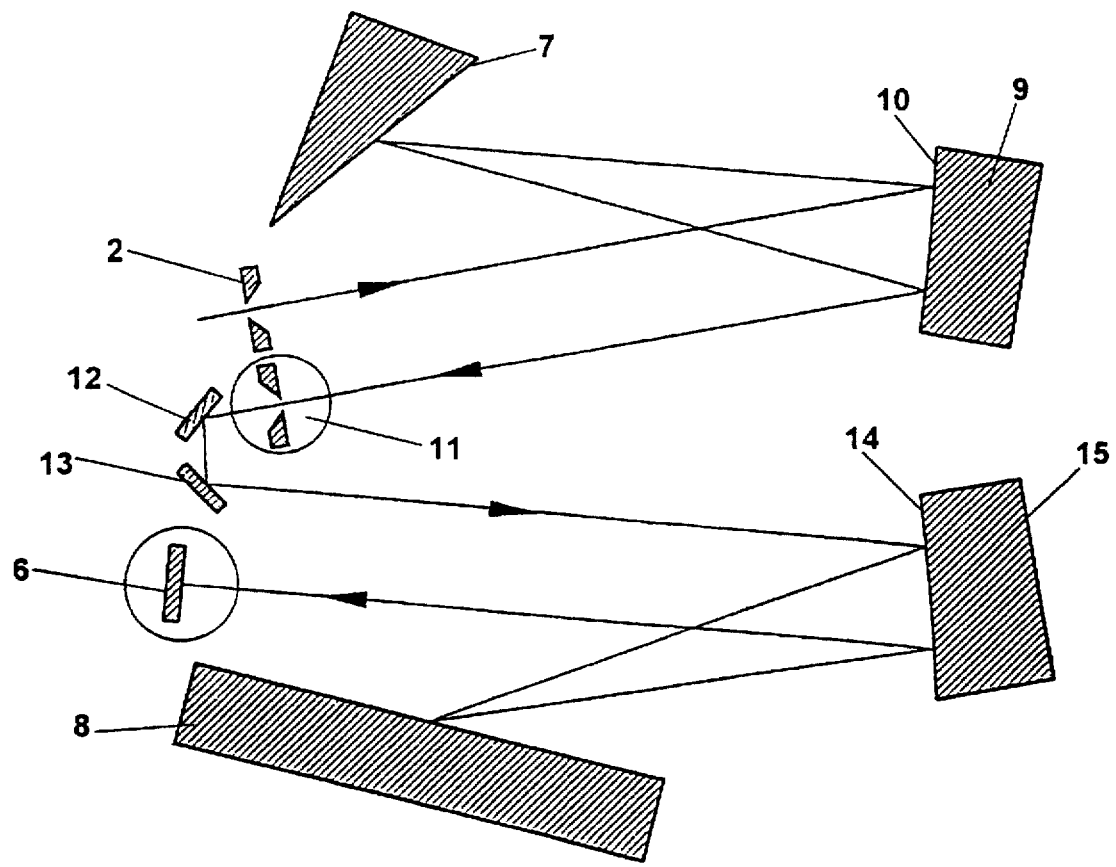
FIG. 2 shows a schematic representation of a monochromator means used in the embodiment according to FIG. 1 and a light-measuring means receiving light from said monochromator means.

As can be seen from FIG. 2, the monochromator means 1 is constructed as a double monochromator comprising a prism monochromator 7 and an echelle monochromator 8. Reference numeral 9 designates in FIG. 2 a mirror with an image-forming, curved reflecting surface 10 by means of which the entry gap 2 is imaged on an intermediate gap 11, the imaging light containing, in accordance with the position of the prism monochromator 7, only a comparatively closely limited wavelength region in comparison with the light falling in through the entry gap 2.

Reference numerals 12 and 13 designate in FIG. 2 path-folding mirrors through which light from the intermediate gap 11 is caused to fall on a curved, image-forming reflecting surface 14 of a further mirror 15. The reflecting surface 14 forms an image of the intermediate gap 11 on the light-measuring means 6. Light from the intermediate gap 11 arriving at the reflecting surface 14 is first reflected to the grating of the echelle monochromator 8, and from said grating it is returned to the reflecting surface 14 while being split still further with regard to its wavelength; at said reflecting surface 14 it is reflected to the light-measuring means 6 while forming an image of the intermediate gap 11. Means which are adapted to be controlled by said unit 27 and which are used for adjusting the position of the prism monochromator and of the echelle monochromator 8 so as to adjust the monochromator means 1 to a specfic wavelength range which is allowed to pass are not shown in FIG. 1 and 2.

As can be seen from FIG. 3, in which the intermediate gap 11 is shown separately, light from a calibration light source (not shown) can be fed through an optical fibre 16 into said intermediate gap 11. Reference numeral 17 designates spectral lines, which are produced by the prism monochromator 7 and which, when seen in the longitudinal direction of the gap, are located in a gap area remote from the gap area into which light coming from a calibration light source is fed into said gap 11 through the optical fibre 16.

In FIG. 4, in which the light-measuring means 6 is shown separately, reference numeral 18 designates a line spectrum which originates from a sample light source to be examined and which is formed by a predispersion at the prism monochromator 7 and a further dispersion at the echelle monochromator 8. As far as it extends over the length of the light-measuring means 6, the line spectrum 18 is imaged on said light-measuring means 6.

Separately from the line spectrum 18, a further line spectrum 19 appears on the light-measuring means 6, said line spectrum 19 being formed by the light of the calibration light source fed at the intermediate gap 11.

As can be seen from FIG. 5, the light-measuring means 6 is provided with two separate CCD pixel fields 20 and 21 with individually adressable pixels. The individual pixels, which have dimensions of 50 µm×12 µm, form lines each containing 256 pixels; the length of the pixel fields being approx. 3.00 mm in the direction of said lines. In total, the pixels of both fields form a matrix array comprising 256× 100 pixels. The two pixel fields 20 and 21 are arranged at a sufficiently large distance from each other for preventing light of a light source to be examined from falling onto the pixel field 21 and light of the calibration light source from falling onto the pixel field 20. Such a division of the pixel field is, of course, not absolutely necessary and it would also be possible to use a continuous field. The matrix lines of the pixel array extend in the direction in which the light impinging on the light-measuring means is dispersed by the monochromator means. The length of the matrix lines is chosen such that the formation of an image of a spectral light pattern of the calibration light source on the pixel field 20 is guaranteed at each adjusting position of the monochromator, said spectral light pattern being adapted to be used for the purpose of calibration. In the matrix columns, the pixels are oriented such that their longitudinal sides extend along a line extending at right angles to the direction of dispersion.

The control and evaluation unit 27 including a computer is provided with means for amplifying and digitizing the pixel signals and with control functions by means of which the measurement time is determined within which the pixels can produce a light intensity-dependent amount of charge. The computer included in said unit 27 is provided with spectra pattern recognition programs by means of which the wavelengths of spectral lines produced by the calibration light source can be recognized and associated with the matrix columns onto which said lines fall. Taking as a basis the wavelengths associated with these matrix columns, these programs are capable of associating, by means of interpolation and/or with due regard to the dispersion caused by the monochromator means, a wavelength value also with matrix columns onto which no spectral line produced by the calibration light source falls.

In the following, the function of the spectrometer device shown in FIG. 1 to 5 will be described.

For determining the spectrum of the sample light source, said sample light source 4 is arranged in front of the entry gap 2 of the monochromator means 1, and the monochromator means 1 is adjusted to a first wavelength value or wavelength region. Simultaneously with the feeding of sample light in the entry gap 2, light of a calibration light source is fed via the optical fibre 16 into the intermediate gap 11. As can be seen in FIG. 4, this has the effect that the line spectrum 18 produced by the sample light source and the line spectrum 19 produced by the calibration light source are imaged separately from each other on the light-measuring means 6, in the pixel fields 20 and 21 of said light-measuring means 6. Via the pixels of field 21, a light measurement is first carried out; during said light measurement, a signal is supplied by those pixels of field 21 onto which a spectral line of the line spectrum produced by the calibration light source falls. Via a recognition program, which takes into account the wavelength value or wavelength region preset at the monochromator and the known spectrum of the calibration light source or the spectral line pattern on the light-measuring means corresponding to the preset wavelength value, the spectral lines of the imaged spectrum 19 of the calibration light source are first identified and the matrix columns in which the pixels receiving these lines are located have associated therewith the wavelength value corresponding to these spectral lines. Taking as a basis the wavelengths which have already been associated with specific pixels, matrix columns on the pixels of which no spectral line falls can also have associated therewith a wavelength value through the program by means of interpolation and with due regard to the position of the individual pixels in the pixel line or/and with due regard to the dispersion caused by the monochromator means. The whole light-measuring means has now been calibrated and spectral lines of the sample light source to be examined which fall on the pixel field 20 can have associated therewith a wavelength value for determining the spectrum of the sample light source.

For measuring the whole spectrum of the sample light source, the monochromator means is continuously adjusted while scanning the sample light source, a simultaneous calibration being again carried out for each adjustment.

Due to the fact that the light of the calibration light source is not fed into the entry gap 2 of the monochromator means 1 but into the intermediate gap 11 of said monochromator means, the light of the calibration light source is not subjected to any presplitting, and, when a calibration light source with a suitable spectrum is selected, it is possible to image a defined spectral light distribution of the calibration light source on field 21 for each possible adjustment of the monochromator means, said defined spectral light distribution containing light of different orders of diffraction of the echelle monochromator.

The processing program used for the adjustment of the light-measuring means and the evaluation of the light measurement values of the sample light source can be of such a nature that the determination of the light measurement values for the sample light source is already carried out while the calibration of the light-measuring means is still taking place. In this way, the total measurement time required can be reduced. Another possible embodiment of the processing program is a variation in the case of which a premeasurement with a short exposure time is carried out for the sample light source so as to determine on the basis of the result of this premeasurement the exposure time for the actual measurement, which is selected such that its length decreases as the intensity increases so that the saturation range of the CCD pixels will not be reached.

For reducing the measurement time still further, the processing program can take into account preinformation so as to carry out the evaluation only on the basis of pixels onto which spectral light, which is important with regard to an analysis, actually falls.

For increasing the measurement accuracy, light intensity correction values for each individual pixel can be stored in the computer of the unit 27 so as to compensate for production-dependent sensitivity differences between the individual pixels.

A sample light source to be examined (or a calibration light source) does not, typically, emit its light in a uniform manner. It follows that, depending on the direction of view, different distributions of the intensity of the light of the source to be examined occur over the length of the monochromator entry gap, and the signal-to-noise ratio in the direction of the gap can vary as well.

With the aid of the two-dimensional light-measuring means and a suitable processing program any desired section of intensity distribution can be examined separately by selecting pixel groups or individual pixels; it is, for example, possible to select an area having a maximum signal-to-noise ratio. Furthermore, the intensity differences occurring in an intensity distribution can be evaluated in premeasurements so as to find out an optimum viewing position of a sample light source, e.g. one having the least possible intensity differences along the gap length.

The intensities of the spectral light patterns imaged on the two-dimensional detector can vary strongly so that the charge to be integrated over a given measurement time essentially exceeds the limited capacity of the pixels. In addition to an adequate adaptation of the measurement time, also the observation range of the samples to be examined can be chosen flexibly, and an optimum combination can be determined for each sample within the framework of a fast premeasurement making only use of pixels that are arranged at the maximum of the intensity profile. This premeasurement can be combined with the wavelength calibration, and it can selectively be followed by a correction of the adjustment position of the monochromator. In the case of very strong light intensities, a plurality of pixels can be combined in the vertical direction whereby the capacity will be increased, and in an extreme case only one single pixel formed will be evaluated. In addition, the position of this pixel can be chosen such that it is remote from the intensity maximum so as to reduce the intensity. Especially when fast survey measurements are carried out, a flexible evaluation of pixels corresponding to different spatial areas of the light source to be examined can be effected so as to provide a dynamic measurement range in such a way that there is no longer any necessity for premeasurements, which will increase the sample throughput.

If the samples are sufficiently long, a measurement light quantity gain can be achieved by extending the gap image formed, but this may cause a noticeable curvature of the gap image which reduces the resolution. The two-dimensional detector offers the possibility of correcting this curvature by evaluating pixels of adjoining columns in accordance with the curved gap image. This type of correction permits a high resolution to be maintained in the case of large measurement light quantities.

The information available due to the two-dimensional detector can also be useful for an exact alignment of the spectrometer, since, as the height of the gap increases, it becomes more and more important that the light entry gaps are aligned such that they extend in parallel. Deviations from parallelism cause gap image enlargements and, consequently, a reduction of the resolution. By means of an appropriate evaluation of the pixel signals of neighbouring pixel columns, a rotational displacement of the entry gaps relative to one another can also in this case be recognized and corrected.

Apart from emission spectrometry, the described device is primarily adapted to be used in the field of atomic absorption spectrometry. In particular in the examination of continuum sources, the high resolution and the exact calibration can be used in an advantageous manner for eliminating and correcting spectral interferences, using preferably mathematical methods, the two-dimensional information of the detector being evaluable in an analogous fashion to the evaluation carried out in the examination of sources emitting line spectra.

I claim:

1. A spectrometer device comprising:
   a monochromator means (1), a light-measuring means (6) receiving light from said monochromator means, and a calibration means comprising a calibration light source, wherein the light -measuring means (6) comprises a plurality of light-measuring elements (22) in a matrix array including light-measuring element lines which extend in a direction of dispersion of the monochromator means and light measuring element columns which extend at right angles to said lines, the calibration means providing an association between the light-measuring elements and wavelengths of spectral light which are detected by the respective light-measuring elements, wherein light from the calibration light source is fed into a slit of said monochromater so that light from a sample light source to be examined and light from said calibration light source fall simultaneously but separately onto light-measuring elements of different light-measuring element lines.

2. A spectrometer device according to claim 1, wherein the calibration means associates a single wavelength value with light-measuring elements of one column.

3. A spectrometer device according to claim 1 characterized in that, being a double monochromator, the monochromator means (1) is constructed such that it comprises a first monochromator (7) carrying out a wavelength preselection and a second monochromator (8) splitting the preselected light still further with regard to the wavelengths.

4. A spectrometer device according to claim 3, characterized in that the first monochromator is a prism monochromator (7).

5. A spectrometer device according to claim 3, characterized in that the second monochromator is an echelle monochromator (8).

6. A spectrometer device according to claim 3, characterized in that the monochromator means (1) is adapted to be adjusted so as to permit a passage of light having different wavelengths or different wavelength regions.

7. A spectrometer device according to claim 6, characterized in that the first (7) and the second (8) monochromators are of such a nature and that the length of the light-measuring means (6) in the direction of dispersion of the received light is dimensioned such that the light-measuring means receives from the second monochromator (8) only light according to approximately one single order of diffraction for each adjustment value of the monochromator means (1).

8. A spectrometer device according to claim 3, characterized in that the light of the calibration light source is adapted to be fed in an intermediate gap (11) provided between said first (7) and said second (8) monochromator.

9. A spectrometer device according to claim 7, characterized in that the calibration light source emits light with wavelengths of such a nature that, when calibration light of the calibration light source is fed into the intermediate gap (11), an exposure of the light-measuring means, which can be evaluated for calibration, is carried out by the calibration light source for each adjustment value of the monochromator means (1).

10. A spectrometer device according to claim 9, characterized in that the calibration light source comprises a neon glow lamp emitting a neon gas spectrum.

11. A spectrometer device according to claim 1, characterized in that the light-measuring means (6) comprises a CCD field.

12. A spectrometer device according to claim 2, characterized in that the matrix array of light-measuring elements comprises two light-measuring element fields (20, 21) which are arranged at a distance from one another.

13. A spectrometer device according to claim 1, characterized in that the light-measuring means comprises elongate light-measuring elements (22) whose longitudinal sides are oriented at right angles to the direction of dispersion.

14. A spectrometer device according to claim 1, characterized in that the light-measuring means comprises rectangular pixels (20) having dimensions of 50 µm×12 µm.

15. A spectrometer device according to claim 2, characterized in that the length along which the light-measuring element matrix lines extend in the direction of dispersion of the monochromator means (1) is approximately 3 mm.

16. A spectrometer device according to claim 1, characterized in that the calibration means comprises a program-controlled data processing unit which processes light-measurement values of the light-measuring means for associating wavelengths and light-measuring elements.

17. A spectrometer device according to claim 16, characterized in that the data processing unit is provided with a pattern recognition program for recognizing spectral image patterns of the calibration light source for each adjustment position of the monochromator means to a specific wavelength or a specific wavelength region.

18. A spectrometer device according to claim 16, characterized in that the recognition program for evaluating the positions of lines of spectral image patterns relative to one another is provided for recognizing lines corresponding to specific wavelengths.

19. A spectrometer device according to claim 16, characterized in that individual correction factors for measured intensity values or individual calibration factors are stored in the data processing unit for at least part of the light-measuring elements.

20. A spectrometer device according to claim 16, characterized in that the data processing unit is provided with a control program for adjusting the monochromator means so as to cause specific spectral lines of a spectral image pattern of the calibration light source to fall precisely onto desired light-measuring elements, and with a means for adjusting the setting scale of the monochromator means.

21. A spectrometer device according to claim 16, characterized in that the data processing unit is provided with a processing program controlling during the association of wavelengths with light-measuring elements the detection of light measurement values produced by a sample light source to be examined.

22. A spectrometer device according to claim 16, characterized in that, on the basis of a preliminary determination of light measurement values of the sample light source, the processing program determines the measurement time for the actual spectral measurement of the sample light source.

23. A spectrometer device according to claim 1, wherein the array includes two light measuring element fields separated by a distance.

* * * * *